July 14, 1931.  L. ZIMERMAN  1,814,778
RAILROAD BRAKE SHOE
Filed March 8, 1928   2 Sheets-Sheet 1
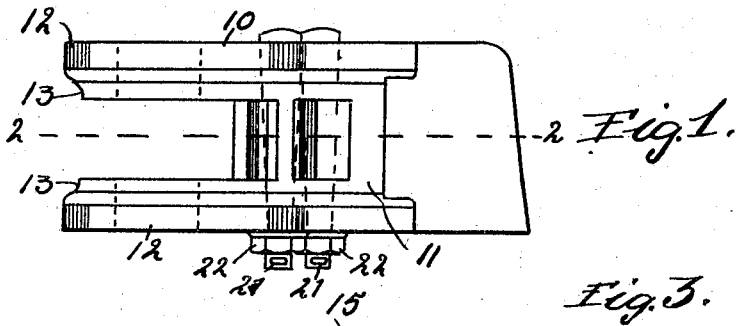
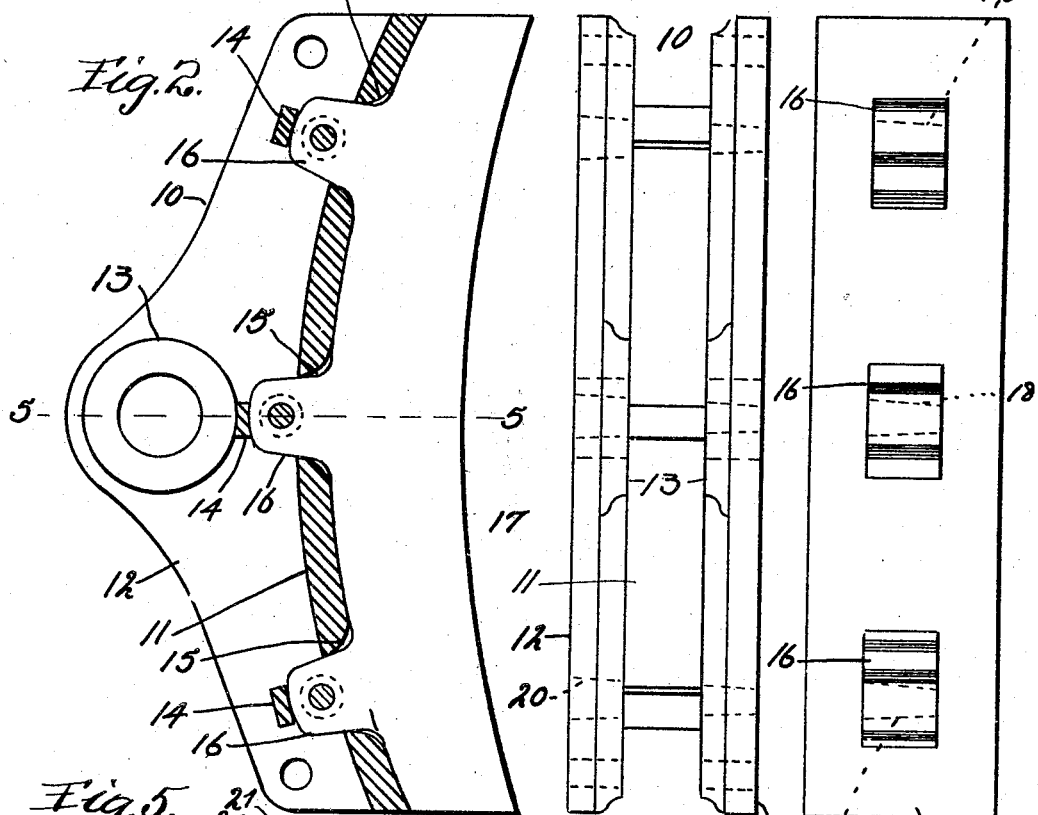
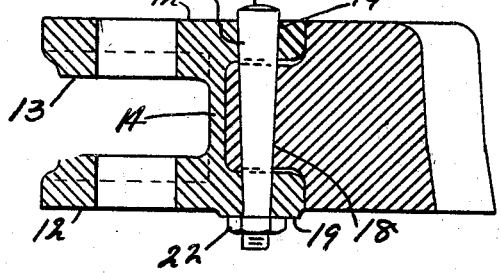
Inventor
Ludwig Zimerman
By W. W. Williamson

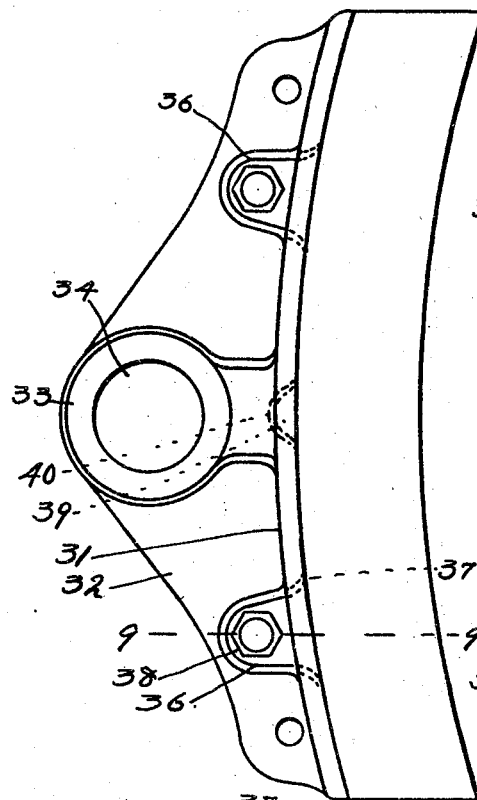
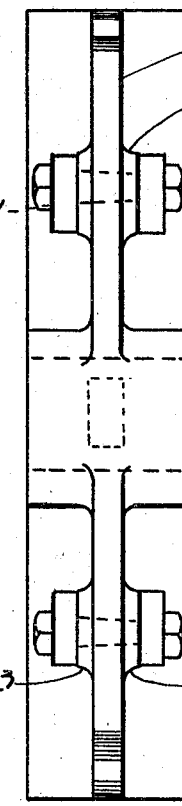
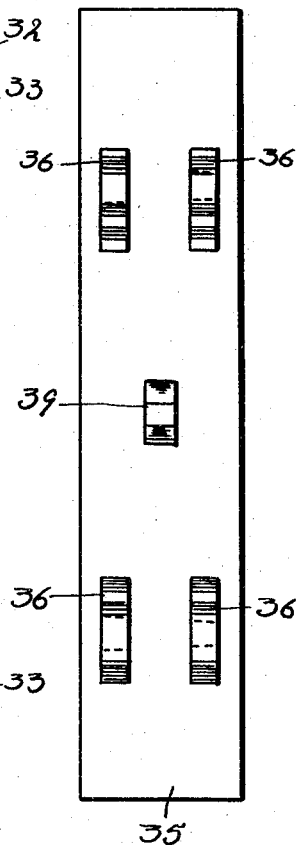
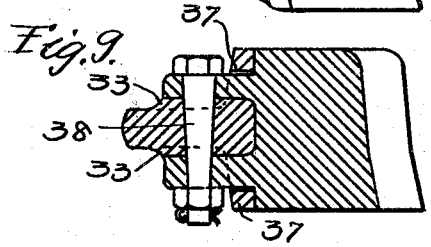

Patented July 14, 1931

1,814,778

UNITED STATES PATENT OFFICE

LUDWIG ZIMERMAN, OF PHILADELPHIA, PENNSYLVANIA

RAILROAD BRAKE SHOE

Application filed March 8, 1928. Serial No. 260,215.

My invention relates to a new and useful improvement in a railroad brake shoe and liners therefor, and has for its object to so construct a brake shoe of this description that while it is light in weight, it will be exceedingly strong.

A further object of my invention is to provide an especially effective lining for the shoe, and a still further object of my invention is to provide convenient and effective means for securing the lining to the shoe in such manner that said lining may be readily removed for repair or replacement.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a plan view looking down upon the upper end of the shoe and its liner.

Fig. 2 is a section at the line 2—2 of Fig. 1.

Fig. 3 is a rear view of the shoe, the liner being removed.

Fig. 4 is a rear view of the liner.

Fig. 5 is a section at the line 5—5 of Fig. 2.

Fig. 6 is a side view of a slightly modified form of a shoe and liner.

Fig. 7 is a rear view of Fig. 6.

Fig. 8 is a detail rear view of the liner used in Figs. 6 and 7.

Fig. 9 is a section at the line 9—9 of Fig. 6.

In carrying out my invention as embodied in Figs. 1 to 5 inclusive, 10 represents the shoe consisting of the curved face plate 11, with which are formed the side plates 12, which latter are sufficiently spaced apart to be passed over the usual attaching lug carried by the brake bar, and upon the inner face of each of these side plates is formed a boss 13 to reduce the friction between these side plates and the brake lug; suitable holes being formed through the lugs for the passage of the usual bolt in attaching shoes to the brake bar.

14 represents cross bars formed with and extending between the side plates to strengthen the latter against lateral strains, and in order that these bars may be more readily cast when the shoe is made by the casting process, the openings 15 are formed through the face plate and in alignment with said cross bars thereby facilitating the molding of the shoe. These openings 15 serve for the passage of the lugs 16 formed upon the brake liner 17.

The liner 17 is formed of any suitable material for coacting with the car wheel to produce the desired friction and withstand in a high degree the wear instant to such use, and the lugs 16 of this liner are provided with tapered holes 18 for the purpose hereinafter explained.

The plates 12 have formed therein the tapered holes 20 for the passage of the tapered bolts 21 upon which are threaded the nuts 22, and these bolts pass through the tapered holes 18 in the lugs 16, so that when these bolts are drawn tightly into place by their nuts, the liner will be drawn snugly and firmly against the face plate, thereby producing a rigid connection between these two members.

From the foregoing description, it is obvious that a light and exceedingly rigid and strong shoe is produced by my invention and that the liner, when attached thereto, will be firmly held in place against strains from their direction, and yet when it is desired to remove the liner for repair or replacement, this may be readily and quickly accomplished by simply removing the nuts 22 from their bolts and forcing said bolts backward through the tapered holes, it being noted that but little or no strain is ever exerted upon the threaded nuts of the tapered bolts on the nuts engaged therewith, and in practice this is of great importance since it facilitates repair and lessens the necessity of such repair.

In Figs. 6 to 9 inclusive, a slight modification of my invention is illustrated in which the face plate 31 has formed therewith a central plate or rib 32 which is bossed as indicated at 33 for passing between the lugs of a brake shoe for attachment to the latter by the passage of a suitable bolt through the hole 34. In this construction the liner 35 is provided with two pairs of lugs 36 for passage through the holes 37 formed in the face plate, and the tapered bolts 38 pass through suitable tapered holes in said lugs and the rib 32 for securing the liner in place in substantially the same manner as before described in connection with the preferred construction.

39 represents a central lug formed with the liner adapted to fit within the socket 40 formed in the face plate so as to more readily position the liner upon the shoe and assist in sustaining the strains instant to the application of the shoe to a car wheel.

Of course I do not wish to be limited to the exact details of construction herein shown, as these may be varied within the limits of the appended claims without departing from the spirit of my invention.

Having thus fully described my invention, what I claim as new and useful is:

1. A brake shoe comprising a face plate having openings therethrough; side plates formed with the face plate, said side plates having holes therethrough for the passage of attaching bolts; strengthening cross-bars connecting the side plates, said side plates also having tapered holes therethrough coinciding with the openings through the face plate for the passage of tapered bolts for the securement of a liner to the shoe.

2. In combination with a shoe of the character described including a face plate having openings therethrough, of a liner, lugs formed thereon for passage through the openings in the face plate of the shoe, said lugs having tapered holes therethrough, and tapered bolts adapted to detachably secure said liner upon said shoe.

In testimony whereof, I have hereunto affixed my signature.

LUDWIG ZIMERMAN.